United States Patent [19]

Landry et al.

[11] 4,103,957

[45] Aug. 1, 1978

[54] TRUCK AIR FOILS

[76] Inventors: Robert G. Landry, 45 Rachel Blvd.,, Lewiston, Me. 04240; Sherman R. Jenney, 27 Rochelle St., Auburn, Me. 04210

[21] Appl. No.: 725,258

[22] Filed: Sep. 21, 1976

[51] Int. Cl.² ............................................. B62D 35/00
[52] U.S. Cl. .................................... 296/1 S; 105/2 R; 224/42.1 E
[58] Field of Search ................. 296/1 S, 91; 105/2 R, 105/2 A, 2 B; 224/42.1 E

[56] References Cited

U.S. PATENT DOCUMENTS

| | | | |
|---|---|---|---|
| 3,348,873 | 10/1967 | Saunders | 296/1 S |
| 3,415,566 | 12/1963 | Kerrigan | 296/1 S |
| 3,425,740 | 2/1969 | Vaughn | 296/1 S |
| 3,695,673 | 10/1972 | Meadows | 296/1 S |
| 3,797,879 | 3/1974 | Edwards | 296/1 S |
| 3,814,472 | 6/1974 | Zelikovitz | 296/1 S |
| 3,834,752 | 9/1974 | Cook | 296/1 S |
| 3,854,769 | 12/1974 | Saunders | 296/1 S |
| 3,866,967 | 2/1975 | Landry | 296/1 S |
| 3,929,369 | 12/1975 | Blair | 296/1 S |
| 3,934,922 | 1/1976 | MacCready | 105/2 R |
| 3,971,586 | 7/1976 | Saunders | 296/1 S |
| 3,977,716 | 8/1976 | Whited | 296/1 S |

*Primary Examiner*—Joseph F. Peters, Jr.
*Assistant Examiner*—John A. Carroll
*Attorney, Agent, or Firm*—Finnegan, Henderson, Farabow & Garrett

[57] ABSTRACT

Disclosed is a truck air foil having upper and lower elongated generally rectangular panels hinged one to the other along opposed edges. A bracket on the forward face of the cargo box pivotally mounts the upper edge of the upper panel while the lower edge of the lower panel is vertically adjustably mounted whereby the angle of attack or both the upper and lower panels is adjustable. A panel, arcuate in cross section, forms a transition surface between the upper panel and the top of the cargo box to reduce air separation from the top surface of the cargo box and minimize drag. In another form, triangular panels are disposed vertically along the lower panel to divide and deflect the air stream laterally toward the opposite sides of the truck air foil likewise to minimize air separation and drag along the sides of the truck. Louvered openings are provided in the lower panel and/or an elongated slot is provided between the lower edge of the lower panel and the front face of the cargo box to provide air flow into the space behind the upper and lower panels and out through opposite open ends of the air foil.

14 Claims, 9 Drawing Figures

TRUCK AIR FOILS

The present invention generally relates to air foils for trucks and the like and particularly relates to truck air foils including a novel and improved aerodynamic body for minimizing air separation along the top and lateral sides of the truck cargo box and reducing aerodynamic drag.

Increased cost of fuel and fuel conservation measures have recently emphasized the importance of improving the aerodynamic characteristics of vehicles, particularly trucks. For example, the large frontal area presented by most trucks has a serious and deleterious impact upon fuel consumption as well as on the maneuverability and consequent safety of truck operations.

Many attempts have been made to improve the aerodynamic characteristics of trucks. For example, air deflectors to minimize drag as the truck advances through the air are frequently utilized. An example of a significant effort to overcome these problems and provide an improved air deflector is described and illustrated in our U.S. Pat. No. 3,866,967 issued Feb. 18, 1975 entitled "Truck Air Foils." In that patent, there is provided an air deflector or air foil having generally rectangular upper and lower panels hinged one to the other along common edges with the upper edge of the upper panel hinged to the front face of the truck's cargo box. The lower edge of the lower panel is mounted in one of a plurality of brackets vertically spaced one over the other along the front face of the cargo box whereby the triangular shaped cross section formed by the upper and lower panels is adjustable.

In U.S. Pat. No. 3,866,967, the upper panel is pivotally secured to the front face of the cargo box below its upper surface in order that the clearance and marker lamps conventionally disposed on truck cargo boxes adjacent their upper surfaces remain in an exposed position. While the air foil disclosed in that patent significantly reduced drag, it has been found that positioning the upper panel below the upper surface of the cargo box is not optimum aerodynamically for minimizing air separation and drag. Also, it has been found that the abrupt transition between the upper panel and the upper surface of the cargo box including the significant vertical step therebetween caused by mounting the upper panel below the upper surface permitted the air stream to separate from the roof skin. This causes the roof skin to undesirably vibrate and flutter and also increased drag.

Furthermore, it has been found that the lower panel, of the air foil disclosed in our prior U.S. Pat. No. 3,866,967, directed air downwardly onto the roof of the truck cab in straight trucks, i.e. those trucks wherein the cargo box is mounted closely adjacent to the truck cab. This creates substantial turbulence, separation of the air stream from the side walls of the cargo box, and increases drag. Also, it has been found through practice that a partial vacuum occurs in the area behind the upper and lower panels causing crosswinds to be undesirably sucked into the space behind the panels. Consequently, while major aerodynamic improvements have been achieved through use of the truck air foil disclosed in our prior U.S. Pat. No. 3,866,967, still further reductions in drag and improved air flow about the truck cargo boxes is desirable.

The present invention provides a truck air foil which minimizes or eliminates many of the foregoing and other problems associated with prior known truck air foils and provides a novel and improved truck air foil having various advantages in construction, operation and use in comparison therewith. Particularly, the present invention provides a truck air foil having upper and lower elongated generally rectangular panels hingedly connected one to the other and disposed on the front face of a truck cargo box, similarly as disclosed in our U.S. Pat. No. 3,866,967, and further includes a transition surface between the upper panel and the top surface of the cargo box. In a preferred form of the present invention, the transition surface includes a panel which is arcuate in cross section and substantially coextensive in length with the rectangular panels. The forward edge of the arcuate panel is secured to the upper edge of the upper panel while its trailing edge is slidably received in a slip connection along the upper surface of the cargo box. As the truck advances and creates an air stream, the air stream flows along the inclined flat upper panel over the arcuate panel and along the top surface of the truck cargo box. This air flow substantially adheres along the arcuate surface causing laminar flow therealong and along the top surface of the truck. This minimizes or eliminates air flow separation between the roof skin and the roof air stream and reduces drag.

In a preferred form hereof, the upper edge portion of the upper panel is pivotally secured at a location spaced forwardly of the forward face of the cargo box. Also, the connection between the lower edge of the lower panel and the front face of the cargo box is vertically adjustable such that the angle of attack of the upper and lower panels is similarly adjustable. This adjustment automatically and desirably changes the radius of curvature of the arcuate panel thus adapting it for the range of adjustment of the rectangular panels while continuing to maintain laminar flow along the cargo box roof skin.

In a further form of the present invention there is provided a flow divider for improving the air flow deflected downwardly by the lower panel about the front face of the cargo box. Particularly, the flow divider includes a pair of generally triangular panels carried by the lower panel and having a generally vertically extending apex along a longitudinal centerline of the air foil. The panels accordingly divide the air stream for flow generally diagonally along the panels and the lower panel in opposite lateral directions without creating substantial turbulence. That is, the flow divider forms two streams of air which flow laterally and downwardly toward the respective opposite sides of the truck. These blend into the slip stream with a minimum of turbulence and air separation along the side surfaces of the truck cargo box and afford a substantial reduction in drag.

A still further form of the present invention provides for flow of air from the air stream into the space behind the upper and lower panels to eliminate the vacuum created therein. In one form, air is transmitted into this space between the lower edge of the lower panel and the front face of the box. In another form, louvered slots are provided in the lower panel to direct air into the space behind the panels. In both instances, this air circulates in a generally circular flow pattern and is directed laterally outwardly through the opposite open ends of the air foil. Thus, the space behind the upper and lower panels is pressurized to avoid creating a vacuum behind the panels and to minimize the undesirable effects of crosswinds.

Accordingly, it is a primary object of the present invention to provide a novel and improved air foil for trucks.

It is another object of the present invention to provide a novel and improved air foil for the cargo box of a truck having improved aerodynamic flow about the cargo box.

It is still another object of the present invention to provide a novel and improved air foil for use with the cargo boxes of trucks which provides for reduced separation of the air stream from the side and top surfaces of the truck cargo box and consequent reduction in drag.

It is a further object of the present invention to provide a novel and improved air foil for the cargo box of a truck having improved air flow passages for eliminating the undesirable effects of crosswinds acting on the air foil and associated cargo box surface.

Additional objects and advantages of the present invention will be set forth in part in the description which follows and in part will be obvious from the description, or may be learned by practice of the invention. The objects and advantage of the invention may be realized and attained by means of the instrumentalities and combinations particularly pointed out in the appended claims.

To achieve the foregoing objects and in accordance with the purposes of the present invention as embodied and broadly described herein, the truck air foil of this invention comprises elongated upper and lower generally rectangular panels, means for hingedly coupling the long lower and upper edge portions of the respective upper and lower panels one to the other, an elongated panel having a generally arcuate cross section and substantially coextensive in length with the rectangular panels, means for connecting a long edge portion of the arcuate panel to the long upper edge portion of the upper rectangular panel, means for mounting the air foil to the truck cargo box including means for connecting said upper panel to the cargo box such that its upper edge portion is spaced forwardly of the cargo box and the upper panel inclines forwardly and downwardly from the front face of the cargo box, means carried by the lower panel for securing it to the cargo box with the lower panel inclining forwardly and upwardly away from the front face of the cargo box, and means for securing the opposite edge portion of the arcuate panel to the cargo box whereby the arcuate panel provides a transition surface between the upper panel and the upper surface of the cargo box to provide generally for laminar flow along the upper surface of the cargo box and thus reduce drag. Preferably, the arcuate panel is provided with a slip connection between its trailing edge and the upper surface of the cargo box to accommodate changes in its radii due to angular adjustments made in the angle of attack of the upper and lower rectangular panels.

The foregoing objects in accordance with the purpose of the present invention are also achieved by providing a truck air foil having elongated upper and lower generally rectangular panels, means for hingedly coupling the long lower and upper edge portions of the respective upper and lower panels one to the other, means for mounting the air foil to the truck cargo box including means for securing the upper panel to the truck cargo box such that it inclines forwardly and downwardly from the forward face of the cargo box, means carried by the lower panel for securing it to the cargo box with the lower panel inclining forwardly and upwardly away from the front face of the cargo box, and a flow divider carried by the lower panel for directing air laterally toward the opposite ends of the lower panel.

In both the previously described embodiments, the present invention may also include an air gap between the lower edge of the lower panel and the front face of the cargo box to admit air into the space behind the upper and lower panels and forwardly of the front face of the cargo box. Also, in either embodiment, air may be transmitted into such space through louvered slots in the lower panel. This air pressurizes the space behind the upper and lower panels and circulates the air in a circular pattern for flow laterally outwardly through the open opposite ends of the air foil. It will be appreciated that the air flow divider may be used in an air foil with or without the arcuate transition segment. Similarly, the louvers or air gap may be provided in an air foil with or without the arcuate transition panel or the flow divider.

The invention consists in the novel parts, construction, arrangements, combinations and improvements shown and described. The accompanying drawings illustrate plural embodiments of the present invention and together with the description serve to explain its principes.

IN THE DRAWINGS

FIG. 1 is a side elevational view of a prior truck air foil substantially as shown and described in our prior U.S. Pat. No. 3,866,967;

Figure 3:
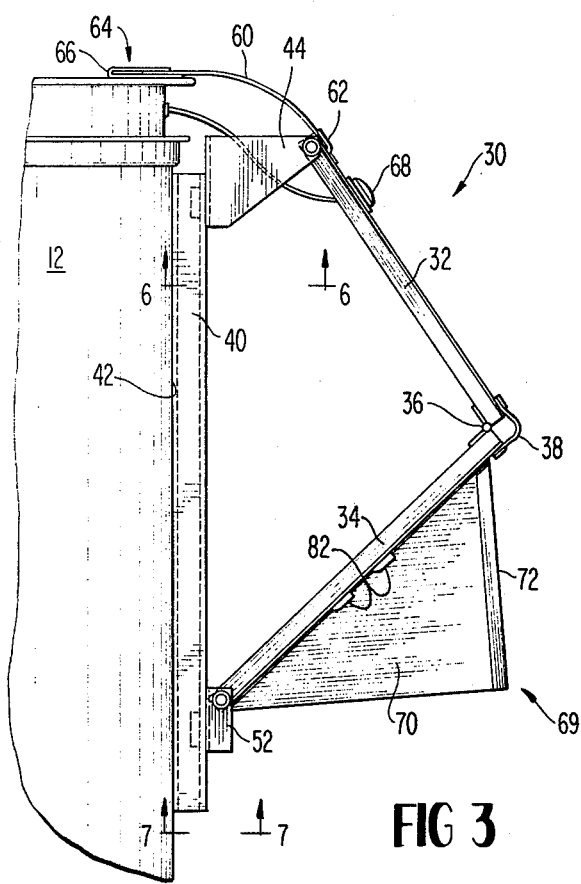
FIG. 3 is an enlarged fragmentary side elevational view of the truck air foil illustrated in FIG. 2.
Figure 6:
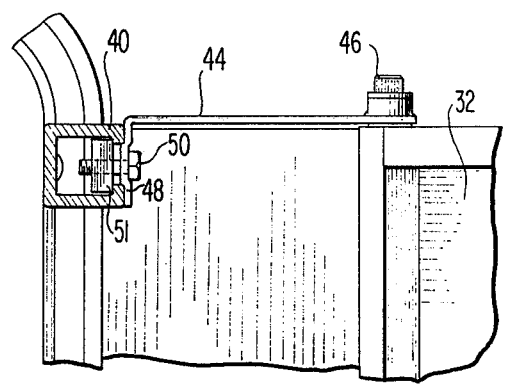
Figure 7:
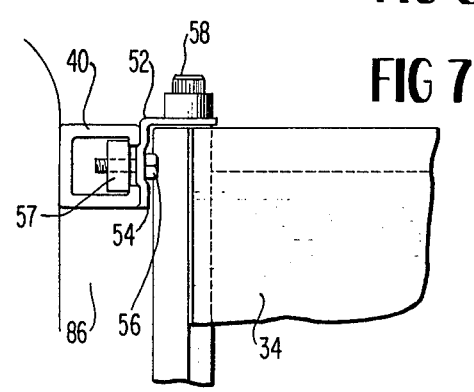
Figure 9:
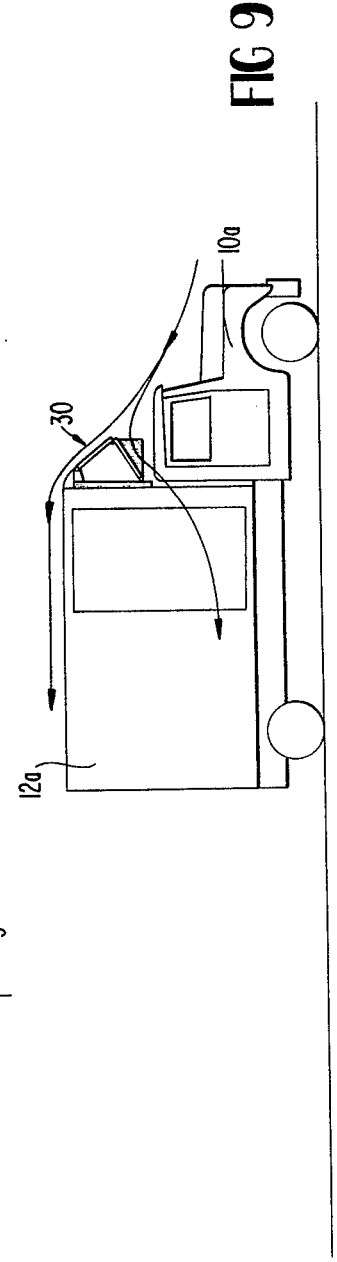
Figure 8:
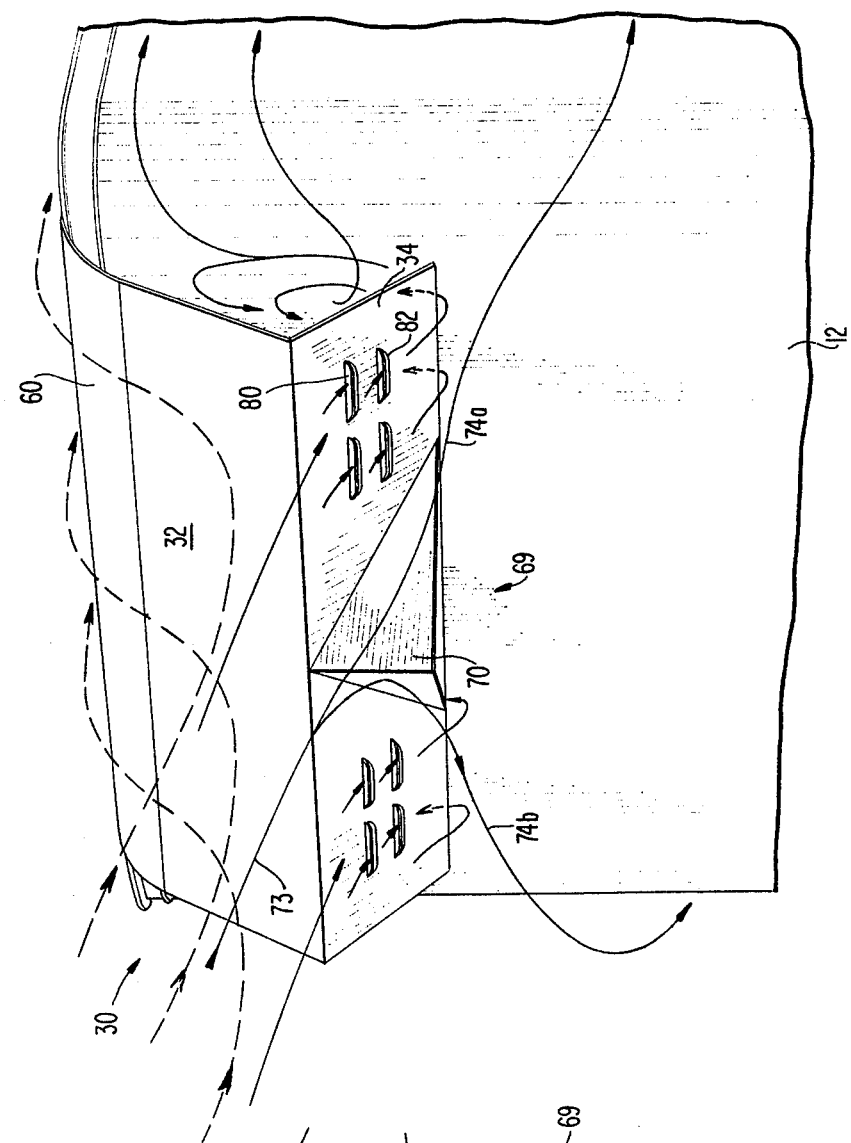

FIGS. 6 and 7 are fragmentary enlarged cross-sectional views taken generally about on lines 6—6 and 7—7 respectively in FIG. 3;

FIG. 8 is a fragmentary perspective view of the air foil hereof illustrating the air flow thereabout; and FIG. 9 is a reduced side elevational view illustrating the truck air foil of the present invention mounted on a straight truck.

Figure 1:
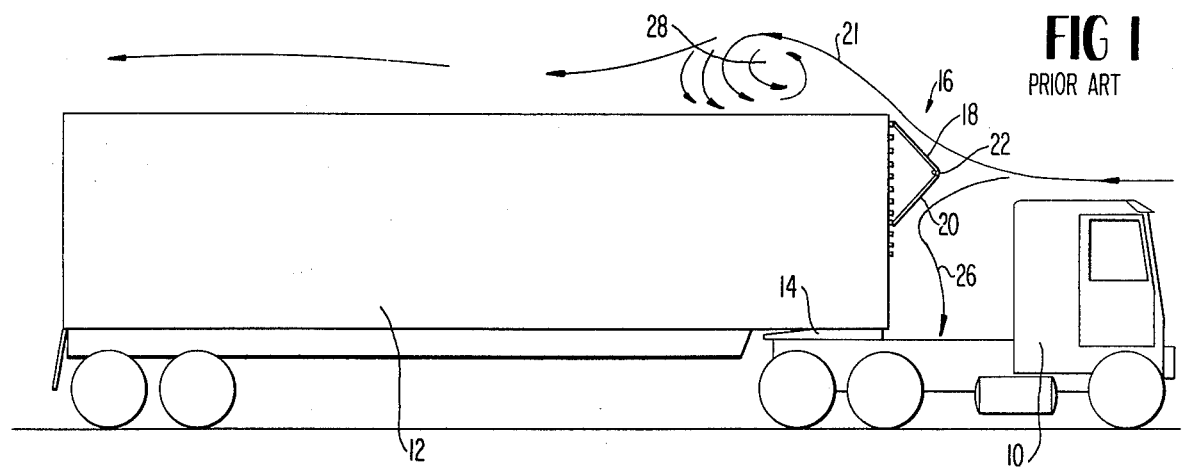

Referring now to the drawings, particularly to FIG. 1, there is illustrated a truck air foil in accordance with the disclosure of our prior U.S. Pat. No. 3,866,967 including a truck cab 10, a truck cargo box 12 carried on a fifth wheel 14, and an air foil generally designated 16 including upper and lower panels 18 and 20 hingedly mounted one to the other at 22. The lower edge of the lower panel 20 is adjustably mounted to the front face of the cargo box 12 such that the angle of the triangle formed by the panels and the front face of the cargo box can be adjusted. The air stream generated by air foil 16 is illustrated by the full lines 21 and 26. As illustrated, air stream 21 impinges against the upper panel 18, and against the vertical step between the upper panel and the top surface of the cargo box and flows over the top of the cargo box 12. The flow is such that it separates from the top surface of the cargo box and creates eddies and turbulence generally designated 28. The air stream 26 which impinges against the lower panel 20 is directed downwardly and similarly creates eddies and turbulence as it passes about the forward edges of cargo box 12. The present invention is primarily concerned with aerodynamic devices which will improve the air flow pattern about the front face of the cargo box in a manner to minimize or eliminate separation of the air stream from the surfaces of the cargo box and reduce drag.

Figure 2:
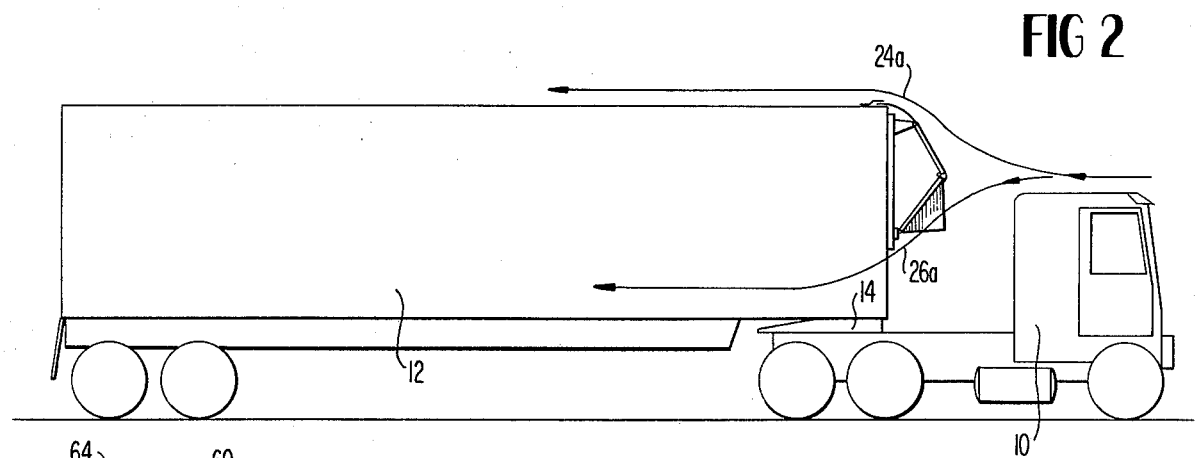
FIG. 2 is a side elevational view of a truck with an air foil constructed in accordance with the present invention mounted thereon.

Referring now to FIGS. 2 and 3, there is illustrated an air foil device constructed in accordance with the present invention and carried by a similar type truck having a cab 10, cargo box 12 and fifth wheel 14. The upper and lower air streams 24a and 26a designated in FIG. 2 illustrate the smooth transition and laminar flow of air over the top surface of the truck and around its forward side edges, respectively, achieved by the present invention and which minimizes or eliminates air stream separation from the top and side surfaces of the cargo box and reduces drag. To accomplish this, the present invention provides an air foil generally designated 30 having upper and lower elongated generally rectangular panels 32 and 34. The lower and upper edges of the upper and lower panels 32 and 34 respectively are hinged one to the other at 36. A suitable flexible fairing 38 overlies the junction of the upper and lower panels to provide smooth division of the air flow along the upper and lower panels respectively. A pair of vertically extending, forwardly opening, channels 40 are disposed along the opposite sides of the front face 42 of the cargo box 12. Adjacent the upper end of each channel 40 there is provided a forwardly projecting bracket 44 which, at its forwardmost extremity, journals a shaft or tube 46 secured to the upper edge of upper panel 32. Each bracket 44 is generally L-shaped as illustrated in FIG. 6 and has a leg 48. A bolt 50 is received through each leg 48 and, in conjunction with a nut 51, secures bracket 44 to the corresponding channel 40. It will be appreciated that the securement is elevationally adjustable and consequently the elevation of each bracket 44 along its associated channel 42 is adjustable as desired.

As illustrated in FIG. 7, a pair of brackets 52 are secured to the respective channels 40 adjacent their lower ends. Particularly, brackets 52 are similarly generally L-shaped and the leg 54 of each bracket receives a bolt 56 whereby, in cooperation with nut 57, each bracket 52 can be secured to its associated channel 40 at an adjusted elevation. Bracket 52 also journals a shaft or tube 58 secured to the lower edge of lower panel 34. With the foregoing arrangement, it will be appreciated that the angles of attack of the upper and lower panels 32 and 34 can be adjusted by elevationally adjusting either brackets 44 or 52 or both along channels 40.

It is a particular feature of the present invention that a smooth transition surface is provided for directing the air stream impinging along upper panel 32 for substantially laminar flow along the top surface of cargo box 12. To accomplish this, a panel 60, shown in FIG. 3, generally arcuate in cross section and coextensive in length with panels 32 and 34, is provided. The forward edge of arcuate panel 60 is received in an elongated bracket or clip 62 secured along the upper edge of upper panel 32. The arcuate panel 60 may be bolted or riveted to bracket 62 such that its forward edge is rigidly secured to the upper panel 32 and a substantially smooth transition surface between panels 32 and 60 is achieved. A slip connection, generally designated 64, is provided for securing the rear edge of arcuate panel 60 to the upper surface of cargo box 12. To achieve this, slip connection 64 comprises an elongated reverse bent bracket 66 defining a forwardly opening slot which extends transversely across the upper surface of the cargo box 12. The rear or trailing edge of arcuate panel 60 is slidably received within the slot for purposes which will become clear from the ensuing description. It will be appreciated that bracket 66 extends forwardly of the forward edge of the roof skin and that, with arcuate panel 60 disposed in the slot formed thereby, a substantially smooth transition from the arcuate panel to the top surface of the cargo box is achieved.

Since arcuate panel 60 would obscure the clearance and marker lamps normally provided on the cargo box adjacent its upper front face, such lamps may be provided instead on the forward face of the air foil. For example, the electrical connections for the marker and clearance lamps conventionally provided on the cargo box can be extended into the air space behind upper panel 32 and coupled to lamps 68 disposed along the outer surface of upper panel 32. Similarly, lamps 68 could be provided, if desired, along the outer surface of arcuate panel 60.

With the foregoing arrangement, arcuate panel 60 provides a transition surface for the air stream impinging along upper panel 32 whereby the air stream adheres to panels 32 and 60 for resultant laminar flow substantially along and parallel to the upper surface of cargo box 12. This is illustrated by the air stream line designated 24a in FIG. 2. By preventing separation of the air stream from the upper surface of the cargo box, turbulence and eddy currents are avoided and drag is substantially reduced.

Furthermore, arcuate panel 60 is readily useful throughout the full range of adjustment of the angles of attack of the upper and lower panels 32 and 34. Arcuate panel 60 is preferably formed of sheet metal which can be flexed to change its radius of curvature. Thus, when the angles of attack of the panels 32 and 34 are changed by elevationally adjusting the location of one or both pairs of brackets 44 and 52 along channels 40, the arcuate panel flexes to a new radius as upper panel 32 pivots about upper bracket 44. The slip connection 64 enables this change in radii by permitting the trailing edge of the arcuate panel 60 to slide forwardly or rearwardly within the reverse bracket 66 depending upon the angle of attack of upper panel 32.

Figure 4:
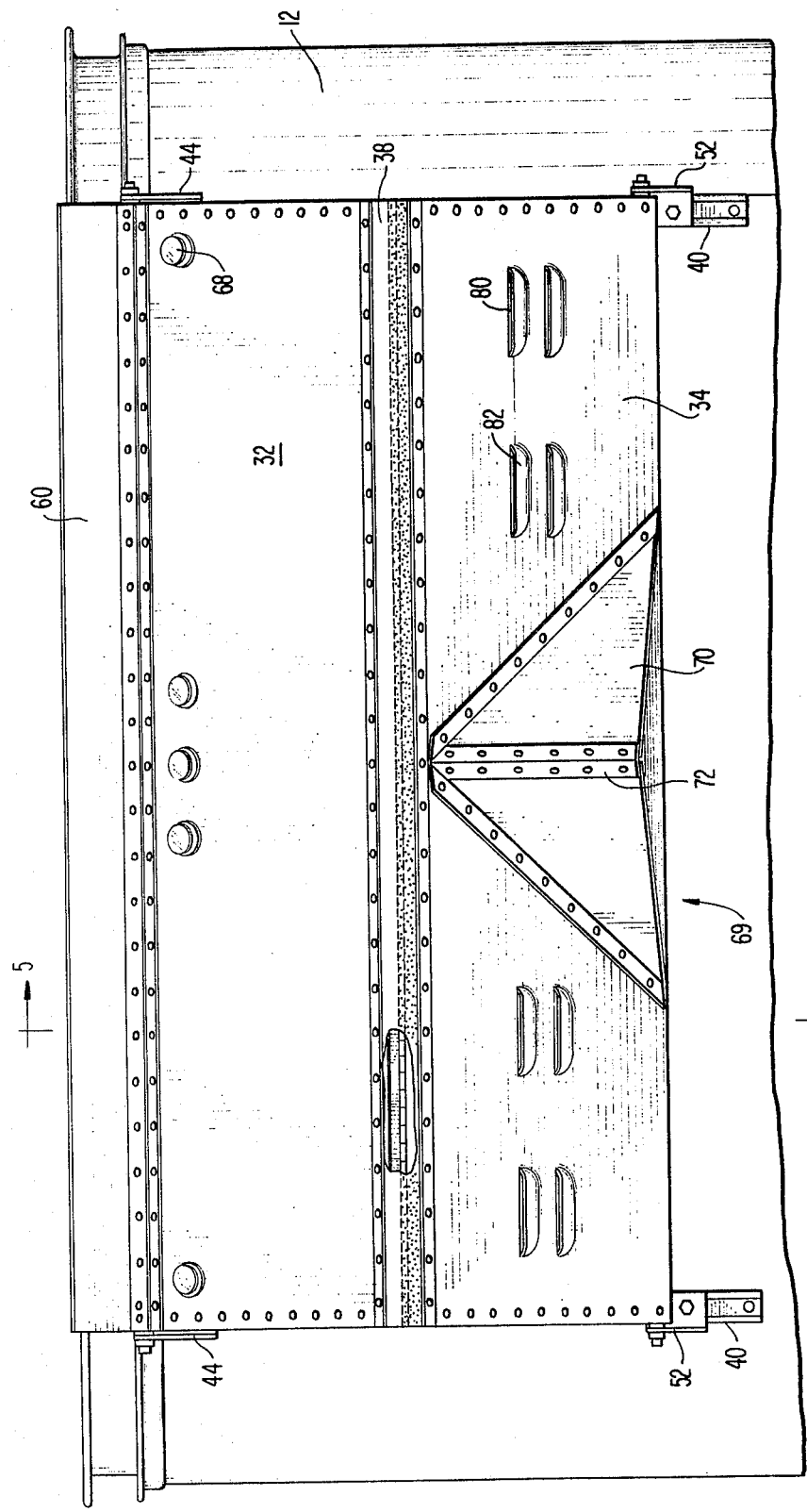
FIG. 4 is an enlarged fragmentary front elevational view of the truck air foil illustrated in FIG. 3.

Referring now particularly to FIGS. 3 and 4, there is provided a flow divider, generally designated 69, for dividing the air stream for movement laterally outwardly along the lower inclined panel 34 toward the opposite sides of the truck for minimizing or eliminating separation of the air stream along the side walls of the cargo box with consequent reduction in drag. Particularly, the flow divider includes a pair of generally triangularly shaped panels 70 rigidly secured one to the other, for example by rivets, along a forwardmost generally vertically extending apex designated 72. The long edges of each panel 70 are secured along the outer surface of the lower panel 34 also by rivets. The panels 70 extend from apex 72 in a lateral and rearward direction. Flow divider 69 thus acts as a wedge dividing the air stream into two discrete streams of air for lateral flow toward the opposite sides of the air foil respectively.

FIG. 8 illustrates the flow of the air stream 73 impinging upon the flow divider. In the absence of flow divider 69, air stream 73 would impact along lower panel 34 creating some turbulence and separation from the front face of the cargo box, and as it moves about the forward corners of this cargo box. With flow divider 69, air stream 73 is divided into two discrete air streams, as indicated by the stream lines 74a and 74b in FIG. 8, which are directed laterally and downwardly, i.e. diagonally. These discrete air streams 74a and 74b minimize the creation of eddies and turbulence in the areas below lower panel 34 and minimize separation of the air stream as it flows about the forward corners and along the sides of the cargo box.

Figure 5:
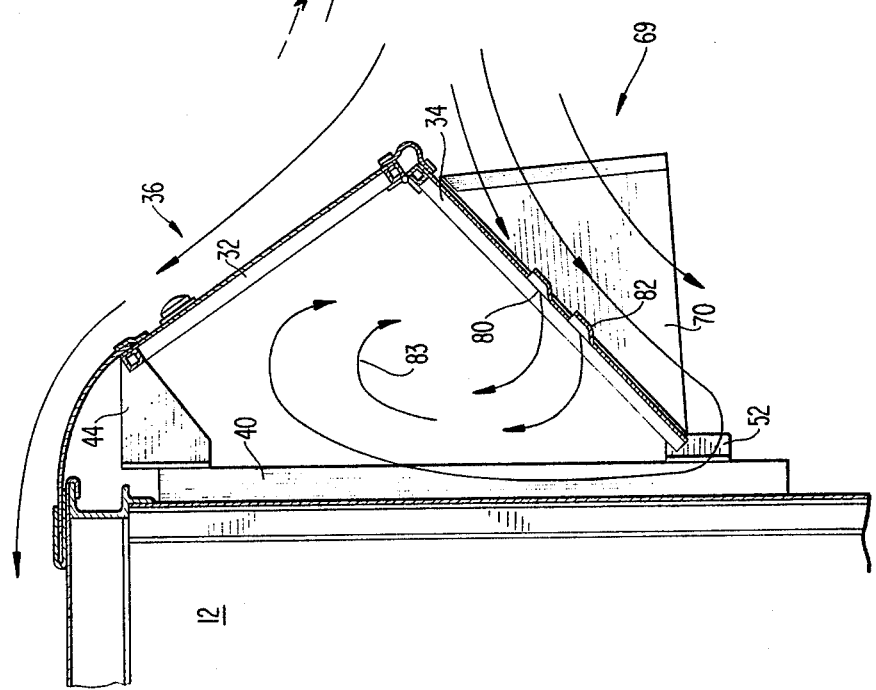
FIG. 5 is a cross sectional view thereof taken generally about on line 5—5 in FIG. 4.

Referring also to FIGS. 3, 4 and 5, louvered openings 80 are provided in lower panel 34 on opposite sides of the longitudinal centerline of the air foil. The louvers 82 defining openings 80 project outwardly from panel 34 and are directed to receive air flowing downwardly and rearwardly along the surface of lower panel 34. As it will be appreciated, the space behind upper and lower panels 32 and 34 and forwardly of the front face of the cargo box is open and this space opens through the open opposite sides of the air foil. It has been found that crosswinds can create an undesirable vacuum in this space increasing drag and interfering with effective control of the truck. As illustrated particularly in FIGS. 5 and 8, air flowing along lower panel 34 is directed by louvers 82 through openings 80 into this space. The direction of the air flowing into this space and the general configuration thereof provide a circular motion or pattern to the air as indicated at 83 in FIG. 5. This air flowing into the space behind the panels effectively pressurizes such space and prevents the formation of a vacuum. Crosswinds entering the open ends of the air foil behind the upper and lower panels blend into this circular air flow pattern behind the upper and lower panels and their energy is dissipated thereby. It will be appreciated that the air which flows through the slots and obtains a circular pattern behind the panels also flows laterally outwardly through the openings at the opposite ends of the air foil.

Further, it will be appreciated that, by locating channels 40 forwardly of the front face of the cargo box, a gap 86 (FIG. 7), coextensive in length with the upper and lower panels, is provided between the front face of the cargo box and the lower edge of lower panel 34. Gap 86 provides for flow of air upwardly into the space behind the upper and lower panels and forwardly of the front face of the cargo box. The air entering this space through elongated gap 86 creates, similarly as the louvered openings 80, a circular air flow pattern within such space, pressurizes such space behind the panels and prevents the previously discussed undesirable vacuum and effects of crosswinds. It will be appreciated that the gap between the front face of the cargo box and the lower edge of the lower panel can be provided in addition to the louvered openings 80 or in lieu of such openings 80 or that the louvered openings 80 can be provided without the elongated gap.

FIG. 9 illustrates a straight truck with the air foil 30 hereof carried by the forward end face of the cargo box 12a directly over the cab 10a. The air foil is particularly effective in this instance to minimize drag caused by impingement of air onto the roof of the cab.

It will be appreciated that the objects of the present invention are fully accomplished in that there is provided an improved aerodynamic body for securement on the front face of truck cargo boxes and which body provides for substantially laminar flow along the top and side surfaces of the cargo box. Thus, this aerodynamic body effectively minimizes separation of air relative to the top and side surfaces of the cargo box and minimizes drag. Also, the undesirable effects caused by creating a vacuum behind the air foil forwardly of the front face of the cargo box are eliminated and part of the energy of the oncoming air stream head winds are dissipated thereby.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A truck air foil for mounting on the front face of a truck cargo box and directing the impinging air stream comprising:

elongated upper and lower generally rectangular panels;

means for hingedly coupling the long lower and upper edge portions of the respective upper and lower panels one to the other;

an elongated panel having a generally arcuate cross section and substantially coextensive in length with said rectangular panels;

means for connecting a long edge portion of said arcuate panel to the long upper edge portion of said upper rectangular panel;

means for mounting said air foil to the cargo box including means for connecting said upper panel to the cargo box such that its upper edge portion is spaced forwardly of the cargo box and said upper panel inclines forwardly and downwardly from the front face of the cargo box;

means carried by said lower panel for securing it to the cargo box with said lower panel inclining forwardly and upwardly away from the front face of the cargo box;

means for securing the opposite edge portion of said arcuate panel to the cargo box whereby said arcuate panel provides a transition surface between said upper panel and the upper surface of the cargo box to provide substantially laminar flow of air along the upper surface of the cargo box and reduce drag;

means for adjusting the inclination of said upper panel and the radius of curvature of said arcuate panel; and wherein the last mentioned connecting means includes a bracket for spacing said upper panel and the front face of the cargo box one from the other, said adjusting means including means for hingedly coupling the upper edge portion of said upper panel to said bracket and means for securing the lower edge portion of the lower panel to the cargo box in a selected one of a plurality of vertically spaced locations such that the lower edge of the lower panel is vertically adjustable along the front face of the cargo box.

2. A truck air foil for mounting on the front face of a truck cargo box and directing the impinging air stream comprising:

elongated upper and lower generally rectangular panels;

means for hingedly coupling the long lower and upper edge portions of the respective upper and lower panels one to the other;

an elongated panel having a generally arcuate cross-section and substantially coextensive in length with said rectangular panels;

means for connecting a long edge portion of said arcuate panel to the long upper edge portion of said upper rectangular panel;

means for mounting said air foil to the cargo box including means for connecting said upper panel to the cargo box such that its upper edge portion is spaced forwardly of the cargo box and said upper panel inclines forwardly and downwardly from the front face of the cargo box;

means carried by said lower panel for securing it to the cargo box with said lower panel inclining forwardly and upwardly away from the front face of the cargo box;

means for securing the opposite edge portion of said arcuate panel to the cargo box whereby said arcuate panel provides a transition surface between said upper panel and the upper surface of the cargo box to provide substantially laminar flow of air along the upper surface of the cargo box and reduce drag; and means providing a slip connection between said opposite edge of the arcuate panel and the cargo box.

3. A truck air foil according to claim 2 wherein said slip connection includes means adapted to be carried by the cargo box and forming a slot opening in a forward direction for slidably receiving said opposite edge portion of the arcuate panel.

4. A truck air foil according to claim 2 including means for adjusting the inclination of said upper panel and the radius of curvature of said arcuate panel, the last mentioned connecting means including a bracket for spacing said upper panel and the front face of the cargo box one from the other, said adjusting means including means for hingedly coupling the upper edge portion of said upper panel to said bracket, means for securing the lower edge portion of the lower panel to the cargo box in a selected one of a plurality of vertically spaced locations such that the lower edge of the lower panel is vertically adjustable along the front face of the cargo box, said slip connection including means adapted to be carried by the cargo box and forming a slot opening in a forward direction for slidably receiving said opposite edge portion of the arcuate panel.

5. A truck air foil according to claim 2 including a lamp carried by said air foil on a forwardly facing surface thereof.

6. A truck air foil for mounting on the front face of a truck cargo box and directing the impinging air stream comprising:

elongated upper and lower generally rectangular panels;

means for hingedly coupling the long lower and upper edge portions of the respective upper and lower panels one to the other;

an elongated panel having a generally arcuate cross-section and substantially coextensive in length with said rectangular panels;

means for connecting a long edge portion of said arcuate panel to the long upper edge portion of said upper rectangular panel;

means for mounting said air foil to the cargo box including means for connecting said upper panel to the cargo box such that its upper edge portion is spaced forwardly of the cargo box and said upper panel inclines forwardly and downwardly from the front face of the cargo box;

means carried by said lower panel for securing it to the cargo box with said lower panel inclining forwardly and upwardly away from the front face of the cargo box;

means for securing the opposite edge portion of said arcuate panel to the cargo box whereby said arcuate panel provides a transition surface between said upper panel and the upper surface of the cargo box to provide substantially laminar flow of air along the upper surface of the cargo box and reduce drag; and means for adjusting the inclination of said upper panel and the radius of curvature of said arcuate panel, the last mentioned connecting means including a bracket for spacing said upper panel and the front face of the cargo box one from the other, said adjusting means including means for hingedly coupling the upper edge portion of said upper panel to said bracket, means for securing the lower edge portion of the lower panel to the cargo box in a selected one of a plurality of vertically spaced locations such that the lower edge of the lower panel is vertically adjustable along the front face of the cargo box, means providing a slip connection between said opposite edge of the arcuate panel and the cargo box, said slip connection including means adapted to be carried by the cargo box and forming a slot opening in a forward direction for slidably receiving said opposite edge portion of the arcuate panel, means carried by said lower panel for dividing the air stream and directing it toward the opposite ends of said lower panel, said dividing means including a pair of substantially vertically disposed planar surfaces joined one to another at an apex substantially centrally of said lower panel and extending rearwardly and laterally from said apex.

7. A truck air foil for mounting on the front face of a truck cargo box and directing the impinging air stream comprising:

elongated upper and lower generally rectangular panels, means for hingedly coupling the long lower and upper edge portions of the respective upper and lower panels one to the other, means for mounting said air foil to the truck cargo box including means for securing said upper panel to said truck such that it inclines forwardly and downwardly from the forward face of the cargo box, means carried by said lower panel for securing it to the cargo box with the lower panel inclining forwardly and upwardly away from the front face of the cargo box, a flow divider carried by said lower panel for directing air laterally toward the opposite ends of said lower panel; and at least two openings in said lower panel on respective opposite sides of the longitudinal centerline of said air foil for directing air through the lower panel into the space behind said panels, the opposite ends of said air foil behind said panels being open to transmit air from said space laterally outwardly through said opposite open ends.

8. A truck air foil for mounting on the front face of a truck cargo box and directing the impinging air stream comprising:

elongated upper and lower generally rectangular panels, means for hingedly coupling the long lower and upper edge portions of the respective upper and lower panels one to the other, means for mounting said air foil to the truck cargo box including means for securing said upper panel to said truck such that it inclines forwardly and downwardly from the forward face of the cargo box, means carried by said lower panel for securing it to the cargo box with the lower panel inclining forwardly and upwardly away from the front face of the cargo box, a flow divider carried by said lower panel for directing air laterally toward the opposite ends of said lower panel; and means providing for passage of air between the lower edge portion of said lower panel and the front face of the cargo box into the space behind said upper and lower panels and forwardly of the front face of the cargo box, at least two openings in said lower panel on respective opposite sides of the longitudinal centerline of said air foil for directing air through the lower panel into the space behind said panels, the opposite ends of said air foil behind said panels being open to transmit air from said space laterally outwardly through said opposite open ends.

9. A truck air foil for mounting on the front face of a truck cargo box and directing the impinging air stream comprising:

elongated upper and lower generally rectangular panels, means for hingedly coupling the long lower and upper edge portions of the respective upper and lower panels one to the other, means for securing said upper panel to the truck cargo box such that said upper panel inclines forwardly and downwardly from the forward face of the cargo box, means carried by said lower panel for securing the lower panel to the cargo box with the lower panel inclined forwardly and upwardly away from the front face of the cargo box, and means providing for passage of air between the lower edge portion of said lower panel and the front face of the cargo box into the space behind said upper and lower panels and forwardly of the front face of the cargo box for pressurizing this space, the opposite ends of said air foil behind said panels being open to transmit air from said space outwardly through said opposite open ends.

10. A truck air foil according to claim 9 including means carried by said lower panel for dividing the air stream and directing it toward the opposite ends of said lower panel.

11. A truck air foil according to claim 9 including means carried by said lower panel for dividing the air stream and directing it toward the opposite ends of said lower panel.

12. A truck air foil according to claim 9 including at least two openings in said lower panel on respective opposite sides of the longitudinal centerline of said air foil for directing air through the lower panel into the space behind said panels, the opposite ends of said air foil behind said panels being open to transmit air from said space laterally outwardly through said opposite open ends.

13. A truck air foil for mounting on the front face of a truck cargo box and directing the impinging air stream comprising:

elongated upper and lower generally rectangular panels, means for hingedly coupling the long lower and upper edge portions of the respective upper and lower panels one to the other, means for securing said upper panel to the truck cargo box such that said upper panel inclines forwardly and downwardly from the forward face of the cargo box, means carried by said lower panel for securing the lower panel to the cargo box with the lower panel inclined forwardly and upwardly away from the front face of the cargo box, and at least two openings in said lower panel on respective opposite sides of the longitudinal centerline of said air foil for directing air through the lower panel into the space behind said panels, the opposite ends of said air foil behind said panels being open to transmit air from said space laterally outwardly through said opposite open ends.

14. A truck air foil according to claim 13 including means carried by said lower panel for dividing the air stream and directing it toward the opposite ends of said lower panel.

* * * * *